Aug. 11, 1925.
H. W. PLEISTER
1,549,327
BOLT ANCHOR
Filed Feb. 1, 1924
2 Sheets-Sheet 1
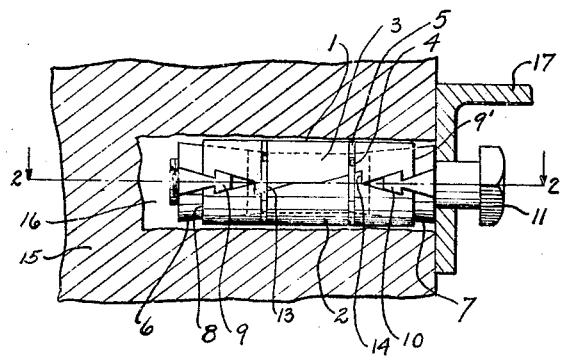
*Fig. 1*
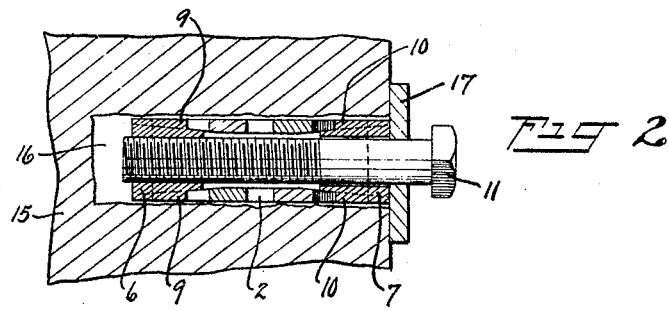
*Fig. 2*
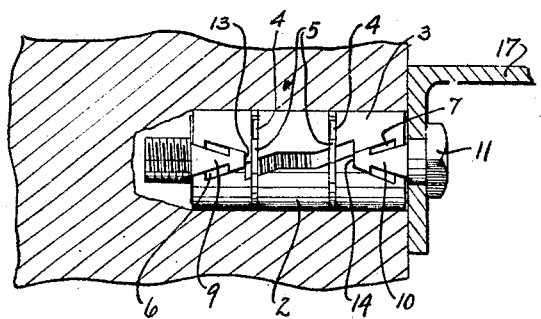
*Fig. 3*
*Fig. 4*  *Fig. 5*  *Fig. 6*  *Fig. 7*
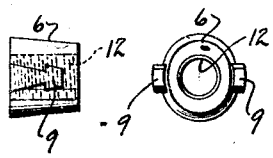  
INVENTOR
Henry W. Pleister
BY
Alan M. Johnson
ATTORNEY Aug. 11, 1925.
H. W. PLEISTER
BOLT ANCHOR
Filed Feb. 1, 1924
1,549,327
2 Sheets-Sheet 2
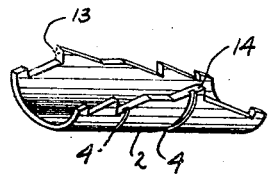
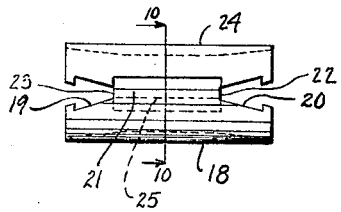
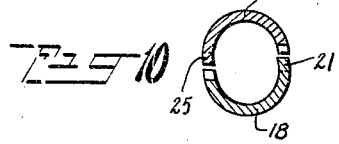
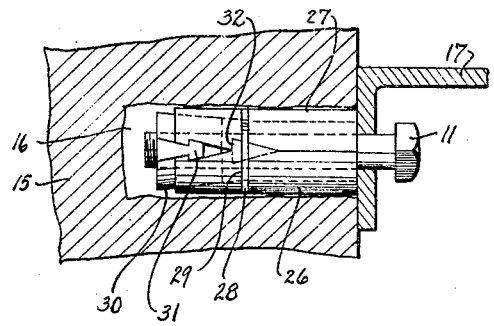
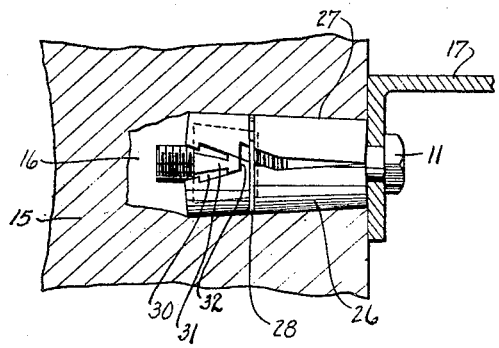
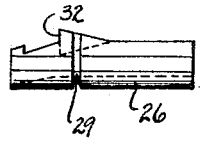

Patented Aug. 11, 1925.

1,549,327

UNITED STATES PATENT OFFICE.

HENRY W. PLEISTER, OF WESTFIELD, NEW JERSEY, ASSIGNOR TO HENRY B. NEWHALL.

BOLT ANCHOR.

Application filed February 1, 1924. Serial No. 689,935.

*To all whom it may concern:*

Be it known that I, HENRY W. PLEISTER, a citizen of the United States, residing at Westfield, in the county of Union and State of New Jersey, have made certain new and useful Improvements in Bolt Anchors, of which the following is a specification, taken in connection with the accompanying drawings.

My invention relates to bolt anchors and more particularly to the type of bolt anchor in which the shield is formed of a plurality of parts, which are expanded by an expanding member, as for example a nut, being drawn or forced between the parts of the shield by rotating a bolt, or other similar member. This general type of bolt anchors is known in the trade as machine type expansions.

It will more fully hereinafter appear, under certain circumstances that this type of machine expansion has proved unsuccessful in use, in that when imbedded in certain relatively soft or yielding material, and put under excessive strains or stresses, the machine or other bolt, and the nut will be pulled entirely through and out of the shield, permitting the work to drop; or pulled partially out of the shield, in which case the work will become dangerously loosened in the wall, floor, or other support.

My present invention also relates more particularly to the machine bolt type of expansion in which the shield members are expanded not only by a cone nut, but also by an unthreaded cone collar, which is mounted in the other end of the expansion to insure that the parts of the shield will be expanded at both ends. This type is generally known as the double expansion type, in contra-distinction to the single expansion type, where only the inner end of the shields are expanded by a screw-threaded nut. In certain of the figures of the drawing I have shown my invention applied to a single expansion in which the cone is non-circular and moves in a straight line.

In the double expansion machine type, it is customary to have the cone nut and cone collar non-circular, preferably elliptical, the interior ends of the shield being correspondingly shaped to receive the elliptical cone and collar; or formed simply to receive the elliptical cone if the collar is not used.

My invention covers such expansions broadly. My invention further relates to certain combinations, details of construction, and articles of manufacture which will be more fully hereinafter described and pointed out in the claims.

Fig. 1 is a vertical section through a wall, or other suitable support, showing my double expansion machine type bolt anchor in side elevation;

Fig. 2 is a horizontal view on the line 2—2 of Fig. 1, looking in the direction of the arrows;

Fig. 3 is a vertical section, similar to Fig. 1, but showing the shield expanded;

Fig. 4 is a side elevation of the conical non-circular screw-threaded nut;

Fig. 5 is an end elevation of the conical non-circular nut;

Fig. 6 is a side elevation of the conical expanding collar;

Fig. 7 is an end elevation of the conical collar;

Fig. 8 is a perspective view of one of the shield sections;

Fig. 9 is a side elevation of a modified form of shield;

Fig. 10 is a cross section on line 10—10 of Fig. 9;

Fig. 11 is a vertical section through a support and the work supported, showing a modification in which my invention is applied to a single machine type expansion bolt;

Fig. 12 is a vertical section, similar to Fig. 11, but showing the parts expanded;

Fig. 13 is a side elevation of one of the shield sections shown in Figs. 11 and 12.

When the machine type of expansions now on the market are mounted in certain more or less yielding material, such as a poor grade of concrete, cinder concrete, asbestos cement, and similar more or less yielding material, after the bolt has forced the nut and collar far enough to create a maximum expansion, and if additional strain or stress is placed upon the nut and collar, either by further screwing the bolt, or by any excessive strain upon the work supported by the bolt, the more or less yielding material will permit the parts of the shield in many instances to still further slightly expand, and this will allow the nut and collar, with the bolt to be entirely pulled out of the shield, or partially pulled out as the case may be. If this additional strain or expanding action is sufficient to simply cause the nut, collar and bolt to be partially withdrawn from the shield, the fastening is dangerously weakened and will permit the work, whatever it may be, to be more or less loosely held to the support. If this excessive strain is sufficient to pull the bolt, with its nut and collar, entirely out of the shield, the work will then fall with possible serious consequences to workmen or property. Of course, when the bolt, nut and collar are withdrawn from the shield, the shield members may still remain in the hole, either expanded or collapsed, but they no longer perform any useful function.

By my invention, I insure that this pulling of the bolt, nut and collar from the shield can never take place, because after the parts have reached their maximum expanded position they are locked, and it is impossible to withdraw the bolt, nut and collar from the shield without pulling the shield, at the same time, from the hole. In practice no strains are ever thrown upon an expansion which would be sufficient to pull out the entire expansion, including the shield members, though in certain yielding materials, as previously pointed out, the bolt and nut have been withdrawn from the shield, thereby rendering the expansion inoperative and of no value.

In the drawings, I have shown different forms of my invention, but it is of course to be understood that these are merely illustrative and that my invention is not to be confined to them.

My bolt anchor 1 includes the two shield members 2 and 3, provided with grooves 4—4 within which are mounted spring rings 5, 5 which hold the shield members together; though, of course, it will be understood that any suitable means may be used to hold the shield members 2 and 3 together, and at the same time hold the conical nut 6 and the conical collar 7 within the shield members.

The conical nut 6 and the conical collar 7 are preferably made non-circular in cross-section, as for example elliptical, and are seated within flaring elliptical seats in the ends 8 and 9′ of the shield members 2 and 3. The conical nut 6 is provided with lugs 9, 9 which are mounted between the meeting edges of the shield members 2 and 3. The conical collar 7 is likewise provided with similar lugs 10, 10 mounted in the same manner but at the other end of the shield.

In this type of machine expansion the conical nut 6 and collar 7 do not appreciably rotate because they are mounted within non-circular and preferably elliptical seats in the ends of the shields. When the machine bolt 11 is turned in the screw-threads 12 within the nut 6, the cone nut 6 will have no appreciable rotation, but on the contrary moves substantially in a straight line along the longitudinal axis of the shield formed by the members 2 and 3. This is also true of the collar 7.

I lock the parts together when the cone 6 and collar 7 have traveled for example far enough to create the maximum expansion, so that it will be impossible to withdraw the machine bolt 11 with its nut 6 and the collar 7 without, at the same time, pulling out the shield members 2 and 3. Any suitable form of locking means may be employed to prevent this withdrawal motion when the parts are in their expanded position.

In Fig. 1, I have shown the shield member 3 provided with stops 13, 13, and the shield member 2 with stops 14, 14, only one of each of said stops being illustrated in Figs. 1 and 3.

When the machine bolt 11 is screwed up to obtain the maximum expansion desired, the ends of the lugs 9, 9 on the cone 6 will engage with the stops 13, 13, Fig. 3, upon the shield member 3, and at the same time the lugs 10, 10 on the collar 7 will engage with the stops 14, 14 on the shield member 2, so that it will be impossible to further expand the shield members 2 and 3 by screwing the machine bolt 11, see Fig. 3.

When the parts are in this position of maximum expansion, and the stops are in engagement, it will be clear that whatever the material of the support 15 may be, whether poor grade of concrete, cinder concrete, asbestos cement, or any other similar yielding material, that it will be impossible to withdraw the machine bolt 11 with its nut 6 and collar 7, without at the same time withdrawing the shield members 2 and 3 from the hole 16. In practice no such excessive strains are ever thrown upon an expansion which would be sufficient to pull out the entire expansion from the hole; though, when mounted in soft material, it is sometimes possible, with the old machine type, to pull the machine bolt 11 with its nut 6 and conical member 7 from the expanded shield members 2 and 3, thereby letting the work 17 fall. If this work 17 be, for example, an electric sign or other heavy work, the failure of the machine expansion will not only permit the sign to fall and be ruined, but also endanger the lives of workmen or pedestrians.

I have shown a modification of my invention in Figs. 9 and 10 in which the shield is formed of two shield members 18 and 24 and is provided with inclined meeting edges 19, 19 and 20, 20 to cooperate with the lugs 9, 9 and 10, 10 upon the cone nut 6 and collar 7. In this form, I provide one of the sections, as for example, the section 18 with an elongated lip 21 which forms stops 22, 23, the former limiting the inward movement of the lug 10 upon the collar 7 and the latter limiting the movement of the lug 9 upon the cone 6. The other shield member 24 is provided with a similar lip 25 so that there will be not rights or lefts.

I have shown another modification of my invention in Figs. 11, 12 and 13 in which the expanding shield members 26 and 27 are held together in any suitable manner, such as by the spring ring 28 mounted in the groove 29. The inner axial bore of the members 26 and 27 is non-circular in cross-section preferably elliptical, to receive and cooperate with the conical nut 30, which is also elliptical in cross-section and provided with the lugs 31, 31, only one being shown in these figures, which illustrate a single expansion machine bolt.

When the bolt 11 is screwed home, as shown in Fig. 12, the cone 30 with its lugs 31 moves in a straight line so that the end of the lug 31 will engage with the stop 32 upon the lower shield member 26. In this position the parts are at their maximum expansion, and the bolt 11 and nut 30 cannot be withdrawn from the shield members 26 and 27. This single expansion with its non-circular or elliptical cone nut 30 has the same advantages as previously pointed out in connection with the other forms.

Having thus described this invention in connection with illustrative embodiments thereof, to the detail of which I do not desire to be limited, what is claimed as new and what is desired to secure by Letters Patent is set forth in the appended claims.

What I claim is:—

1. In an expansion bolt, the combination of expansible means formed of a plurality of parts having meeting edges and stop means carried by the expansible means, and extending above the longitudinal axis of the expansible means, and expanding means moving in a straight line and adapted to cooperate with the stop means carried by the expansible means.

2. In an expansion bolt, the combination of an expansible shield formed of a plurality of parts having meeting edges and provided with one or more stops extending above the longitudinal center of the shield, one or more expanding members, and means to guide said members in a straight line.

3. In a machine expansion, the combination of an expansible shield formed of a plurality of parts having meeting edges and provided with stops which extend above the longitudinal center of the shield, an expanding nut, stops carried by the nut to engage with the stops on the shield when the shield is expanded, and means to cause the nut to move in a straight line.

4. In a machine expansion, the combination of an expansible shield formed of a plurality of parts having meeting edges and provided with stops which extend above the longitudinal center of the shield, an expanding nut, an expanding collar, stops carried by the nut and collar to engage with the stops on the shield when the shield is expanded, and means to cause the nut and collar to move in a straight line.

5. In an expansion bolt, the combination of a plurality of expansible members having meeting edges provided with inclined surfaces and stops immediately contiguous to the inclined surfaces to limit the maximum expansion of the expansible members, and one or more expanding members adapted to move in a straight line and provided with engaging members cooperating with the inclined surfaces on the meeting edges and with the immediately contiguous stop to limit the maximum expansion of the expansible members.

6. In an expansion bolt, the combination of a plurality of expansible members having meeting edges provided with inclined surfaces and stops immediately contiguous to the inclined surfaces to limit the maximum expansion of the expansible members, and one or more non-circular expanding members adapted to move in a straight line and provided with engaging members cooperating with the inclined surfaces on the meeting edges and with the immediately contiguous stop to limit the maximum expansion of the expansible members.

7. In an expansion bolt, the combination of an expansible shield having meeting edges provided with inclined surfaces and stops, a cone nut to expand the shield, means to insure that the cone nut will move in a straight line, and lugs on the cone nut adapted to normally cooperate with the inclined surfaces to expand the shield and also to normally engage with the stops when the predetermined expansion of the shield has been obtained.

8. In a machine expansion, the combination of an expansible shield having two sets of inclined meeting edges and stops contiguous to the inclined meeting edges, an expanding nut, cooperating with one set of inclined meeting edges and stops, and an expanding collar cooperating with the other set of inclined edges and stops, to expand the shield and limit the expansion to the predetermined extent.

9. In a machine expansion, the combination of an expansible shield having two sets of inclined meeting edges and stops contiguous to the inclined meeting edges, an expanding nut, cooperating with one set of inclined meeting edges and stops, and an expanding collar cooperating with the other set of inclined edges and stops, to expand the shield and limit the expansion to the predetermined extent, and means to guide the nut and collar in a straight line.

HENRY W. PLEISTER.

Witnesses:
MARY R. RYAN,
A. M. WILLIAMS.